Figure 1:
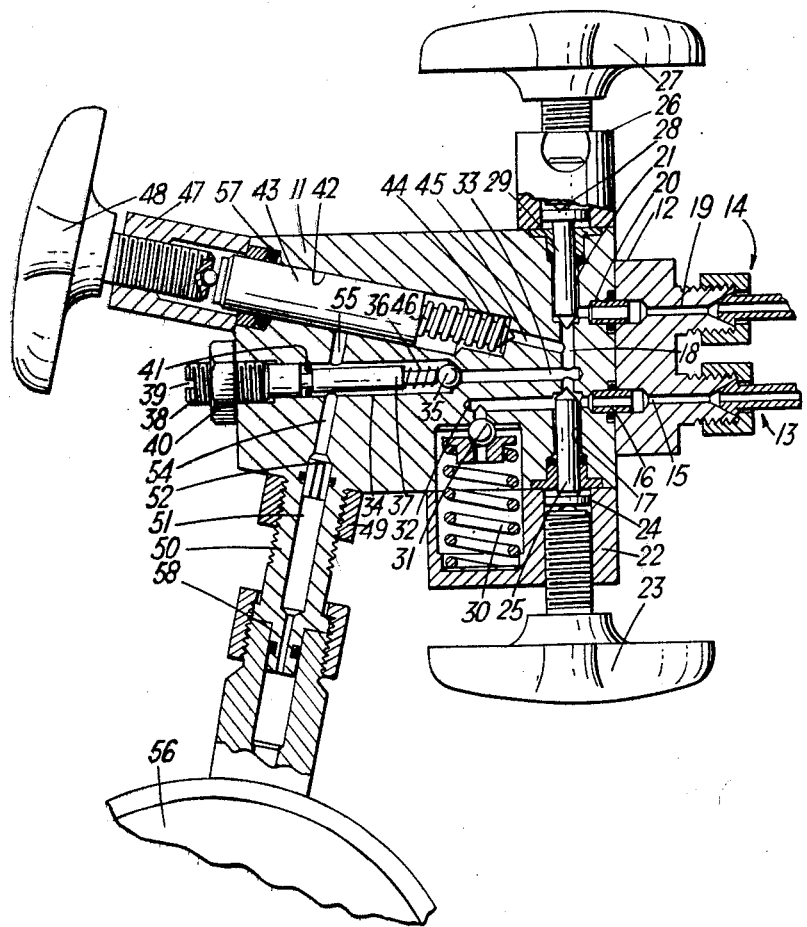

Oct. 13, 1964     R. S. EMERSON     3,152,473
TESTING DEVICE FOR COMPRESSION IGNITION ENGINES
Filed Aug. 26, 1963     2 Sheets-Sheet 1

Inventor
REGINALD S. EMERSON
By Imirie & Smiley
Attorneys

Oct. 13, 1964  R. S. EMERSON  3,152,473
TESTING DEVICE FOR COMPRESSION IGNITION ENGINES
Filed Aug. 26, 1963  2 Sheets-Sheet 2

Inventor
REGINALD S. EMERSON

United States Patent Office 3,152,473
Patented Oct. 13, 1964

3,152,473
TESTING DEVICE FOR COMPRESSION
IGNITION ENGINES
Reginald Stanley Emerson, Buckingham, England,
assignor to Leslie Hartridge Limited, Buckingham
County, England, a British company
Filed Aug. 26, 1963, Ser. No. 304,378
Claims priority, application Great Britain, Sept. 3, 1962,
33,725/62
20 Claims. (Cl. 73—119)

This invention relates to a device for testing compression ignition or "Diesel" engines, and particularly the fuel injection equipment of such engines.

For the correct functioning of a compression ignition engine it is important that the fuel injection system should perform in a highly efficient manner and that there should be an absolute minimum of leakage during operation between the fuel injection pump pistons and their cylinders, and between the injector needles and their seats, otherwise inefficient running, and, in particular, a smoky exhaust will result.

An object of the invention is to provide a simple instrument or testing device for checking the efficiency of operation of the fuel injection equipment of a compression ignition engine.

Another object is to provide a simple testing device adapted for connection in turn in the fuel line from each injection pump outlet to the respective injector in order to carry out several different tests, in order to check the efficiency of operation of the injection equipment for each engine cylinder separately.

A further object is to provide a testing device by which the compression pressure of each engine cylinder may be checked, in addition to comprehensive tests on the fuel injection system associated therewith.

A still further object is to provide a versatile testing device which is so small and easily portable that it can be used in the field, and may readily be taken to a broken-down vehicle, instead of it being necessary to tow the vehicle to a testing station.

Still another object is to provide a portable testing device in which the pressure gauge and other parts in the testing device, and in the fuel injection system, are fully protected against accidental sudden increases or falls in fuel pressure which could damage the pressure gauge or other parts of the testing device or the fuel injection system.

Still a further object is to provide a testing device for compression ignition engines of more general utility than testing devices hitherto known.

As broadly claimed, the testing device according to the invention comprises means defining a duct, inlet and outlet connections on said means enabling it to be connected in any one of the fuel lines to the injectors of an engine, said inlet and outlet connections communicating with said duct, a manually operated inlet closure valve to cut off communication between said inlet connection and said duct, a manually operated outlet closure valve to cut off communication from said duct to said outlet connection, a fluid pressure gauge and a connection therefrom through a non-return valve to the said duct, a manually operated release valve having a piston portion which is a slack fit in a cylinder formed in the body, so that a controlled leakage may take place between the piston and cylinder, sealing means preventing the escape to atmosphere of such fuel oil as leaks along the piston, a connection from the pressure gauge to the cylinder at an intermediate point along the length of the cylinder, the valve portion of the release valve being attached to the piston portion and adapted to seat on a seat formed at the end of a passage which communicates with the said duct. A pressure relief valve may be provided in the inlet connection to prevent excessive rise of pressure anywhere in the system associated with the device.

Other objects, and the features of the invention, will appear from reading the following description of one embodiment of the invention, with reference to the accompanying drawings in which—

Figure 2:
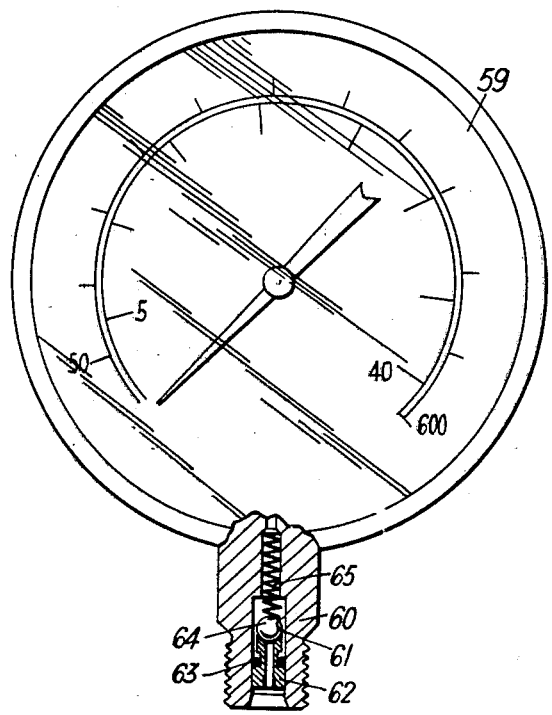

FIGURE 1 is a sectional elevation of a testing device according to the invention; and FIGURE 2 is a view in elevation of a low-pressure pressure-gauge with the coupling portion thereof shown in section to illustrate the construction of a non-return valve therein.

Referring to FIGURE 1, a testing device comprises a body 11, which may conveniently be fabricated from a block of mild steel. Attached to the body is a block 12 containing two pipe connections, indicated respectively by references 13 and 14, the connection 13 being an inlet connection and the connection 14 being an outlet connection. The connections 13 and 14 are formed with hollow cones and each is provided with a cap nut adapted to engage a male cone formed in the well known manner on the end of a thick-walled pipe of the kind used in fuel injection work. A passage 15 leads from the connection 13 to a ferrule 16 which conducts the fuel oil into a passage 17 leading to one end of a smaller diameter duct 18, there being a fluid seal around the ferrule 16 to make the connection pressure tight. Similarly, a passage 19 leads from the connection 14 through a ferrule 20 into a passage 21 which communicates with the other end of the duct 18. A block 22 attached to one side of the body contains a screw terminating in a knob 23 adapted for manual operation, there being a ball or hemispherical part at the inner end of the screw which engages a disc 24 adapted to press upon a needle valve 25 which engages a seat formed at the junction of the passage 12 and the duct 18, the valve constituting an inlet closure valve. In similar fashion, a block 26 attached to the other opposite side of the body 11 contains a screw having a knob 27 at its outer end and a ball or hemispherical part at its inner end which engages a disc 28 adapted to press upon a needle valve 29 which engages a seat formed at the junction of the passage 21 and the duct 18, this valve constituting an outlet closure valve.

The block 22 also contains the end of a spring 30 associated with a pressure relief valve 31 which communicates through a passage 32 with the inlet passage 17 and is arranged so that if the pressure in the inlet passage 17 rises above a predetermined maximum the valve 31 opens and the fuel oil in the passage is allowed to discharge at a convenient point (not shown).

Leading from the duct 18 is a further passage 33 which leads to a larger passage 34, there being a valve seat formed at the junction of the passages 33 and 34 in which a ball valve member 35 is seated. The valve member 35 is urged on to its seat by a spring 36, and the lift of the valve member 35 from its seat is limited by a stop member or plug 37 at the end of a screw 38 engaged in a thread formed in the body. The screw 38 may be adjusted by a screwdriver engaging a slot 39 in its end and locked in position by means of a lock nut 40, there being a fluid seal 41 around the stop member to prevent leakage of fuel oil out of the body.

A cylinder 42 is formed in the body, and within it is a piston portion 43 of a release valve which is constituted by a smaller diameter extension of the piston 43, the end of the extension being conical and adapted to seat on a seat formed at the junction of a reduced diameter portion 44 of the cylinder 43 and a small passage 45 which communicates with the duct 18. A spring 46 bears at one end on the bottom of the reduced diameter portion 44 and at its other end on the shoulder at the junction of the piston 43 and the smaller diameter extension, so as to urge the release valve off its seat. A block 47 contains a screw having a knob 48 for manual operation attached to its outer end and provided with a ball at its inner end which bears upon the outer end of the piston portion 43.

A further block 49 contains a connecting member 50 having a passage 51 which is connected through a ferrule 52, provided with a fluid seal, with a passage 54 which communicates with the passage 34, and a further passage 55 leads from the passage 34 to the cylinder 42. The cylinder 42 is of somewhat larger diameter than the piston portion 43 so that fuel oil arriving in the cylinder 43 via the passage 55 may leak at a controlled rate along the annular space between the piston 42 and the cylinder 43 into the bore 44 and thence into the passage 45, when the release valve is open. The outer end of the connecting member 50 is adapted to have a pressure gauge 56 connected to it.

A fluid seal 57 is provided around the piston portion 43 and seals are also provided around the needle valve 25, the needle valve 29, and a spigot 58 on the end of the fitting 50, which fits into the coupling portion of the pressure gauge 56, to provide fluid sealing so that no oil can leak out of the body 11 at any point.

It will be clear that if the release valve is completely closed no fuel oil can be discharge through the passage 55 but if the release valve is opened by turning the knob 48 fluid from the passage 55 may leak past the piston 43 into the bore 44 and through the passage 45 into the duct 18.

FIGURE 2 shows a pressure gauge including a non-return valve in the coupling portion, arranged so that pressure fluid may flow to the gauge but not in the other direction. The gauge 59 has an inlet fitting 60 containing a bore 61 in which a seat member 62 is slidable, there being a resilient fluid seal 63 located in a groove in the seat member 62. A passage leads from the outer end of the seat member 62 to its inner end, at which a valve seat is formed, and upon the valve seat is a ball valve member 64 which is acted upon by a valve spring 65. The connecting member 50 of FIGURE 1 is formed with a spigot 58, as already mentioned, and when the gauge 59 is mounted on the body 11 in place of the gauge 56 the spigot 58 enters the bore 61 and pushes the seat member 62 into the bore 61. The gauge 59 may conveniently be adapted for measuring pressures up to 500 or 600 pounds per square inch, in contrast to the gauge 56, which may be scaled up to 5,000 or 10,000 pounds per square inch.

In carrying out tests using the gauge 59 (which, as hereafter fully described, is employed for measuring the compression pressure in the different cylinders of the engine) the pressure in the gauge 59 is raised to the maximum compression pressure and this pressure is held by the non-return valve. When, however, the gauge 59 is dismounted from the testing device the seat member 62 slides outwardly and thereby relieves the pressure in the gauge.

The testing device as described above has great versatility and may be used for carrying out various tests on a compression ignition engine. Assuming that the inlet connection 13 of the testing device is connected to one of the output fittings of the fuel injection pump and the outlet connection 14 of the device is connected to the input connection of the respective injector, then tests may be carried out as follows:

(1) *To Measure the Peak Injection Pressure*

The inlet and outlet closure valves are opened and the release valve is closed. The engine is started and allowed to run. At each engine cycle a charge of fuel oil passes from the injection pump through the instrument and to the injector. As the pressure rises at each injection cycle a small amount of fuel oil passes the non-return valve and enters the bore 34 and the rising pressure build up in the bore 34 is transmitted to the pressure gauge, which gives a reading. As more fuel oil passes the non-return valve the reading of the pressure gauge rises until a position of equilibrium is reached at which the pressure in the bore 34 is equal to the peak injection pressure. With the engine idling or running at a chosen higher speed the peak pressure should be above a certain minimum if the injection pump element is in good condition and the injector is functioning correctly. When the test has been completed the engine is stopped and the release valve is opened, so that the pressure in the bore 34 is allowed gradually to leak away past the piston. This gradual leakage past the piston prevents the gauge from being damaged by a sudden reduction of pressure. If the engine is running and its speed is varied while the release valve is slightly open, then the reading of the pressure gauge will vary with the speed variation but will always give an indication which is substantially equal to the peak injection pressure.

(2) *To Test the Element Condition*

If the injection pump element (piston and cylinder) is worn then it is incapable of pumping at the peak pressure required and the rate of pressure rise is slower than it should be. For this test, the inlet closure valve is opened and the outlet closure valve is closed, so that fuel oil pumped to the testing device is not allowed to pass on to the injector, and the release valve is also closed. The high pressure pipe lines connecting the other pump elements to the respective injectors are all slackened so that no injection can take place into any engine cylinder. The controls are set for starting in the usual way and the engine starter is operated. The fuel injection pump element connected to the device is thus made to pump against a blind end and the pressure which it is capable of developing under these conditions is measured by the pressure gauge. If the element is in very good condition and the pressure tends to become excessive then it can "unload" through the relief valve.

(3) *To Check "Sticking" of Fuel Injection Pump Delivery Valve or Injector Needle*

If the fuel injection pump delivery valve or the injector needle valve is a tight fit in the respective guide, or foreign matter is present, the particular valve will tend to remain open instead of closing at the end of each injection under the influence of its spring. For this test the outlet closure valve and the inlet needle valve are opened and the release valve is almost closed. The engine is started and its speed is slowly varied upwardly and downwardly. If the delivery valve and the injector are functioning correctly then the maximum pressure indicated by the pressure gauge will rise and fall steadily with engine speed but if there is any sticking of either of these components then jerks or kicks will be observed in the pressure gauge needle.

(4) *To Check Leakage Through Pump Delivery Valve*

If, through wear or other causes, the delivery valve in the fuel injection pump leaks when closed, it has a considerable effect on the efficient running of the engine. For this test, the inlet and outlet closure valves are opened and the release valve is opened. The engine is started and run for a period and is then stopped. Immediately the engine stops the outlet closure valve is closed so that communication with the injector is cut off. The release valve is screwed inwardly and, due to the action of its piston, the pressure of the entrapped fuel oil is raised. The operation of the release valve piston is continued until the pressure rises to, say, 3,000 pounds per square inch, and the device is then left alone. Any leakage through the pump delivery valve results in a gradual drop in the pressure and a limit may be applied, for example, that the pressure should not drop below 2,500 pounds per square inch in less than 15 seconds.

(5) Checking Injector Performance

The injector contains an automatic needle valve and if this leaks when closed it enables fuel to seep through the injection orifice to the outer surface of the injector nozzle where it is converted to carbon. The carbon deposit, which gradually builds up, has a bad effect on the engine performance. For this test the inlet and outlet closure valves are opened and the release valve is opened. The engine is run for a period and is then stopped. Immediately the engine stops the inlet closure valve is closed, to cut off communication with the injection pump. The release valve piston is then screwed in quickly until the pressure is just below the opening pressure for the injection nozzle. The piston is now screwed in slowly when the "pop" made by the injector needle valve, as it opens and rapidly closes, can be heard. The nozzle should "pop" each time the gauge pressure exceeds the nozzle opening pressure. The correct functioning and opening pressure of the nozzle needle is thus checked.

If the injector is functioning properly, i.e., is "popping" correctly, the combined leakage past the nozzle seat and needle may be measured by timing the rate of pressure drop from an initial pressure, which is set by screwing in the release valve piston until the desired initial pressure is reached. If the injector is leaking badly it will not "pop" and the pressure in the system will fall much more rapidly.

(6) To Check Engine Compression Pressure

With the engine running the release valve and its piston are screwed back a considerable distance. The engine is then stopped and the inlet closure valve is closed, thus cutting off the fuel injection pump. The pressure gauge is then removed and replaced by another pressure gauge operative on a lower pressure range, for example, 500 pounds per square inch. The release valve is screwed in until the pressure gauge reads about 400 pounds per square inch. The adjusting screw which acts upon the spring in the injector nozzle is then unscrewed until the pressure drops to zero. This indicates that the spring pressure has been completely removed from the injector needle valve and the engine cylinder pressure can act through the injector orifice on the fuel oil in the testing device.

The engine is started. The piston is screwed in until the pressure gauge needle is steady. The reading on the pressure gauge then indicates the peak compression pressure.

From the above description it will be evident that I have provided an instrument which, while very simple and easily portable, is adapted to carry out a considerable number of useful tests which together provide quite a comprehensive picture of the condition of the engine and its fuel injection. Furthermore, the testing device may be connected to the engine in a very easy and rapid manner and without dismantling any part of the engine itself. It will, of course, be understood that various modifications may be made in the arrangement of the testing device within the scope of the invention.

I claim:
1. A testing device for compression ignition engines comprising:
   (a) body means defining a duct;
   (b) inlet and outlet connections on said body means adapted respectively to be connected to one output point of a fuel injection pump and to the inlet of the respective injector, said inlet and outlet connections communicating with said duct;
   (c) a manually operated inlet closure valve to cut off communication between the inlet connection and said duct;
   (d) a manually operated outlet closure valve to cut off communication from said duct to said outlet connection;
   (e) a fluid pressure gauge;
   (f) a non-return valve connected between the said duct and the pressure gauge to permit fuel oil to flow from the said duct to the pressure gauge but not in the opposite direction;
   (g) a manually operated release valve having a piston portion operating in a cylinder, the fit between the piston portion and the cylinder being sufficiently slack to allow a controlled leakage of fuel oil along said piston portion, the valve portion of said release valve being attached to said piston portion;
   (h) sealing means preventing the escape to atmosphere of such fuel oil as leaks along the piston;
   (i) a connection from said pressure gauge to said cylinder at an intermediate point along the length of said cylinder;
   (j) and a passage communicating with the said duct having a valve seat formed at its end engaged by said valve portion.

2. A device as claimed in claim 1 wherein said body means comprises a block defining said duct, said block being adapted to have said inlet and outlet connections and the pressure gauge secured to it and said block containing the said passage communicating with said duct, said inlet and outlet closure valves and said non-return valve, and said release valve and said cylinder for said piston.

3. A device as claimed in claim 1 comprising screw means for effecting the operation of said release valve and for displacing said piston in its cylinder.

4. A device as claimed in claim 1 comprising a pressure relief valve communicating with said inlet connection to prevent excessive rise of pressure anywhere in the system associated with the device.

5. A device as claimed in claim 2 comprising a pressure relief valve communicating with said inlet connection to prevent excessive rise of pressure anywhere in the system associated with said device, said block containing said pressure relief valve.

6. A device as claimed in claim 1 comprising:
   (a) a spring to bias said non-return valve to the closed position;
   (b) and an adjustable stop to limit the lift of said non-return valve from its seat to protect said pressure gauge against too violent application of pressure.

7. A device as claimed in claim 1 adapted for testing the cylinder pressure of an engine comprising a further non-return valve in said pressure gauge to permit the flow of fuel oil to the pressure gauge and to prevent the flow of fluid in the opposite direction.

8. A device as claimed in claim 7 in which said further non-return valve and its body are a sliding fit in a coupling portion of said pressure gauge formed with a screw thread to screw on to the body of said device, whereby unscrewing said pressure gauge allows said further non-return valve and body to slide outwardly to relieve the pressure entrapped by said further non-return valve.

9. A device as claimed in claim 1 wherein said sealing means preventing the escape to atmosphere of such fuel oil as leaks along the piston comprises a fluid seal around the piston portion of said release valve to prevent leakage of fluid out of said body.

10. A testing device for compression ignition engines comprising:
   (a) a block having inlet and outlet connections adapted respectively to be connected to one outlet of the engine fuel injection pump and to the inlet of the respective injector;
   (b) a duct within said block communicating with said inlet and outlet connections;
   (c) a manually operated inlet closure valve to cut off communication between said inlet connection and said duct;

(d) a manually operated outlet closure valve to cut off communication between said duct and said outlet connection;

(e) a relief valve in said block communicating with said duct to prevent excessive pressure rise therein;

(f) a fluid pressure gauge attached to said block;

(g) a non-return valve connected between said duct and said pressure gauge to permit fuel oil to flow from said duct to said pressure gauge but not in the opposite direction;

(h) a manually operated release valve having a piston portion operating in a cylinder formed in said body, the fit between said piston portion and said cylinder being sufficiently slack to allow a controlled leakage of fuel oil along said piston, the valve portion of said release valve being attached to said piston portion;

(i) sealing means preventing the escape to atmosphere of such fuel oil as leaks along the piston;

(j) a connection from said pressure gauge to said cylinder at an intermediate point along the length of said cylinder;

(k) a passage communicating with said duct;

(l) and a valve seat formed at the end of said passage engaged by said valve portion.

11. A device as claimed in claim 10 comprising:

(a) a spring to bias said non-return valve on to its seat;

(b) and an adjustable stop to limit the lift of said valve from its seat to protect said pressure gauge against too sudden application of pressure.

12. A device as claimed in claim 10 adapted for testing the cylinder pressure of an engine comprising a further non-return valve in the pressure gauge to permit the flow of fuel oil to the pressure gauge but not in the opposite direction.

13. A device as claimed in claim 12

(a) in which said further non-return valve and its body are a sliding fit in a coupling portion of said pressure gauge;

(b) and comprising a screw thread on said coupling portion adapted to screw on to the body of the device, whereby unscrewing the pressure gauge allows said further non-return valve and body to slide outwardly to relieve the pressure entrapped by said further non-return valve.

14. A device as claimed in claim 10 comprising a fluid seal around said piston portion of said release valve to prevent said escape of fuel oil to atmosphere.

15. A device as claimed in claim 10 comprising spring means to urge said release valve away from its seating, the manual operating means being effective to force said release valve on to its seat against the pressure of said spring means.

16. A device as claimed in claim 10 comprising screw means for effecting the operation of said release valve and for displacing said piston.

17. A device as claimed in claim 10 in which said block contains said duct and passage and said inlet closure valve, said outlet closure valve, said non-return valve, said release valve and said pressure relief valve.

18. A device as claimed in claim 17 comprising a separate block attached to said body containing said inlet and outlet connections.

19. A device as claimed in claim 18 comprising a further block attached to said body containing a connecting member to which said pressure gauge may be connected.

20. A testing device for compression ignition engines comprising:

(a) a block having an inlet connector and an outlet connector connectable respectively to one outlet of an engine fuel injection pump and to the inlet of the respective injector;

(b) a duct within said block communicating with said inlet and outlet connectors;

(c) a manually operated inlet closure valve for severing communication between said inlet connector and said duct;

(d) a manually operated outlet closure valve for severing communication between said duct and said outlet connector;

(e) a pressure relief valve in said block communicating with said duct to prevent excessive pressure rise therein;

(f) a fluid pressure gauge;

(g) a non-return valve connected between said duct and said pressure gauge to permit fuel oil to flow from said duct to said pressure gauge but not in the opposite direction;

(h) a spring to bias said non-return valve on to its seat;

(i) an adjustable stop to limit the lift of said non-return valve from its seat to protect said pressure gauge against too sudden application of pressure.

(j) a manually operated release valve comprising a piston portion and a valve portion, said piston portion operating in a cylinder formed in said body with a small diametral clearance to allow a controlled leakage of fuel oil therealong, said valve portion being attached to said piston portion;

(k) a resilient seal around said piston portion to prevent leakage of fuel oil from said body;

(l) a connection from said pressure gauge to said cylinder at an intermediate point along the length of said cylinder;

(m) a passage communicating with said duct having a valve set formed at its end which is engaged by said valve portion of said release valve;

(n) and spring means to urge said release valve away from said valve seat, said manual operating means being effective to force said relief valve on to its seat against the pressure of said spring means.

No references cited.